(12) United States Patent
Ke et al.

(10) Patent No.: US 8,917,850 B2
(45) Date of Patent: Dec. 23, 2014

(54) METHOD AND SYSTEM FOR IMPLEMENTING MULTIMEDIA RING BACK TONE SERVICE AND MULTIMEDIA CALLER IDENTIFICATION SERVICE

(71) Applicant: Huawei Technologies Co., Ltd., Shenzhen, Guangdong (CN)

(72) Inventors: Shanyang Ke, Nanjing (CN); Yuan Bao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/909,757

(22) Filed: Jun. 4, 2013

(65) Prior Publication Data

US 2013/0267211 A1   Oct. 10, 2013

Related U.S. Application Data

(60) Division of application No. 12/558,317, filed on Sep. 11, 2009, now Pat. No. 8,483,378, which is a continuation of application No. PCT/CN2008/070375, filed on Feb. 29, 2008.

(30) Foreign Application Priority Data

Mar. 13, 2007 (CN) .......................... 2007 1 0005692
Aug. 14, 2007 (CN) .......................... 2007 1 0140642

(51) Int. Cl.
*H04M 3/42* (2006.01)
*H04W 4/16* (2009.01)
*H04L 29/06* (2006.01)

(52) U.S. Cl.
CPC ............ *H04W 4/16* (2013.01); *H04M 3/42017* (2013.01); *H04L 65/1016* (2013.01); *H04L 65/1096* (2013.01); *H04M 3/42051* (2013.01)
USPC ...................................................... 379/207.15

(58) Field of Classification Search
USPC ..................................... 379/207.15; 455/433
See application file for complete search history.

(56) References Cited

U.S. PATENT DOCUMENTS

| 4,811,382 A | 3/1989 | Sleevi |
| 7,693,134 B2 | 4/2010 | Batni et al. |

(Continued)

FOREIGN PATENT DOCUMENTS

| CN | 1770799 A | 5/2006 |
| CN | 1801856 A | 7/2006 |

(Continued)

OTHER PUBLICATIONS

1st Office Action in corresponding European Patent Application No. 08715111.4 (Apr. 30, 2013).

(Continued)

*Primary Examiner* — Rasha Al Aubaidi
(74) *Attorney, Agent, or Firm* — Leydig, Voit & Mayer, Ltd.

(57) ABSTRACT

A method for implementing Multimedia Caller Identification (MCID) service is disclosed. The method includes: if the network determines that the calling UE is an MCID service subscriber and determines that the called UE supports the MCID early media, the network negotiates the MCID early media with the called UE, and plays a MCID to the called UE if the negotiation succeeds. In addition, a system for implementing the MRBT service and MCID service is disclosed. The present invention enables the MCID service in an IP Multimedia Subsystem (IMS) so that users may use the multimedia services in the IMS and have a better experience.

13 Claims, 9 Drawing Sheets

(56) References Cited

U.S. PATENT DOCUMENTS

| | | | |
|---|---|---|---|
| 8,543,169 B1* | 9/2013 | Wuthnow | 455/567 |
| 2006/0165059 A1 | 7/2006 | Batni et al. | |
| 2007/0294411 A1* | 12/2007 | Hakkarainen | 709/227 |
| 2008/0045209 A1 | 2/2008 | Mo et al. | |
| 2008/0102800 A1 | 5/2008 | Cheng et al. | |
| 2009/0262908 A1 | 10/2009 | Choi et al. | |

FOREIGN PATENT DOCUMENTS

| | | |
|---|---|---|
| CN | 1832518 A | 9/2006 |
| CN | 1859475 A | 11/2006 |
| CN | 1859496 A | 11/2006 |
| EP | 1677485 A1 | 7/2006 |
| JP | 20060191594 A | 11/2006 |
| KR | 20070025351 A | 3/2007 |
| RU | 2002130462 A | 5/2004 |

OTHER PUBLICATIONS

Office Action in corresponding Japanese Patent Application No. JP2009-552993 (Dec. 26, 2011).

1st Office Action in corresponding Chinese Patent Application No. 200710140642.1 (Oct. 18, 2010).

Camarillo et al., "Early Media and Ringing Tone Generation in the Session Initiation Protocol (SIP)," XP015009732, Dec. 2004, The Internet Society, Reston, Virginia.

Rosenberg et al. "Reliability of Provisional Responses in the Session Initiation Protocol (SIP)," XP015009040, Jun. 2002, The Internet Society, Reston, Virginia.

Camarillo, "The Early Session Disposition Type for the Session Initiation Protocol (SIP)," XP015009731, Dec. 2004, The Internet Society, Reston, Virginia.

Extended European Search Report in corresponding European Patent Application No. EP08715111.4 (Jan. 5, 2011).

Written Opinion of the International Searching Authority in corresponding International Patent Application No. PCT/CN2008/070375 (Jun. 12, 2008).

International Search Report in corresponding International Patent Application No. PCT/CN2008/070375 (Jun. 12, 2008).

Office Action in corresponding Russian Patent Application No. RU2009137769 (Feb. 1, 2011).

Notice of Allowance in corresponding Russian Patent Application No. 2009137769 (May 3, 2011).

Notice of Allowance in corresponding Korean Patent Application No. 10-2009-7017106 (Jun. 30, 2011).

$2^{nd}$ Office Action in corresponding parent U.S. Appl. No. 12/558,317 (Aug. 21, 2012).

Written Opinion of the International Searching Authority in corresponding PCT Patent Application No. PCT/CN2008/070375 (Jun. 12, 2008).

International Search Report in corresponding PCT Patent Application No. PCT/CN2008/070375 (Jun. 12, 2008).

\* cited by examiner

METHOD AND SYSTEM FOR IMPLEMENTING MULTIMEDIA RING BACK TONE SERVICE AND MULTIMEDIA CALLER IDENTIFICATION SERVICE

CROSS-REFERENCE TO RELATED APPLICATIONS

This application is a division of U.S. patent application Ser. No. 12/558,317, filed on Sep. 11, 2009, which is a continuation of International Patent Application No. PCT/CN2008/070375, filed on Feb. 29, 2008. The International Patent Application claims priority to Chinese Patent Application No. 200710140642.1, filed on Aug. 14, 2007, and Chinese Patent Application No. 200710005692.9, filed on Mar. 13, 2007. The afore-mentioned patent applications are hereby incorporated by reference in their entireties.

FIELD OF THE INVENTION

Embodiments of the present invention relate to communication technologies, and in particular, to a method and system for implementing the Multimedia Ring Back Tone (MRBT) service and the Multimedia Caller Identification (MCID) service.

BACKGROUND OF THE INVENTION

With the development of mobile communication networks and popularization of mobile User Equipment (UE), mobile network operators provide more diversified value-added services for the UE apart from the basic call service. For example, the Color Ring Back Tone (CRBT) service and the Color Caller Identification (CCID) service are provided in the $2^{nd}$ Generation (2G) mobile communication networks. The CRBT service includes: when the called UE (also referred to as a mobile station in a 2G network) rings in a peer-to-peer call, the calling UE receives an audio clip preset by the called UE instead of a traditional ring back tone in the mobile network. The CCID service includes: when the called UE rings in a peer-to-peer call, the ring tone of the called UE is not an audio clip stored locally, but an audio clip that is preset by the calling UE and sent from the mobile communication network to the called UE.

In a $3^{rd}$ Generation (3G) network, the CRBT service and the CCID service may be extended to the MRBT service and the MCID service respectively. The MRBT service includes: when the called UE rings in a peer-to-peer call, the calling UE receives an audio and/or video clip preset by the called UE. The MCID service includes: when the called UE rings in a peer-to-peer call, the ring tone of the called UE is not an audio clip stored locally, but an audio and/or video clip that is preset by the calling UE and sent from the mobile communication network to the called UE. Both the CRBT service and the MRBT service are preset by the called UE, and received by the calling UE. Both the CCID service and the MCID service are preset by the calling UE, and received by the called UE.

In the conventional art, the methods for implementing the MRBT service and the MCID service are applied in a Circuit-Switched (CS) system, and are not applicable to an IP Multimedia Subsystem (IMS), which restricts the user experience.

SUMMARY OF THE INVENTION

Embodiments of the present invention provide a method and system for implementing the MRBT service and the MCID service to overcome the defect in the prior art, namely, poor user experience caused by unavailability of the MRBT service and the MCID service in an IMS.

A method for implementing the MRBT service in an embodiment of the present invention includes:

receiving a call request from a calling UE, where the call request carries a called UE identifier, and an early session supporting (Early-Session) capability identifier and reliable responses capability identifier of the calling UE; and determining that the called UE is an MRBT service subscriber according to the called UE identifier, determining that the calling UE supports the MRBT early media according to the Early-Session capability identifier and the reliable responses capability identifier of the calling UE, negotiating the MRBT early media with the calling UE, and playing an MRBT to the calling UE after successful negotiation.

An apparatus for implementing the MRBT service in an embodiment of the present invention includes:

an MRBT call receiving unit, adapted to receive a call request from a calling UE, where the call request carries a called UE identifier, and an Early-Session capability identifier and a reliable responses capability identifier of the calling UE; and an MRBT negotiating unit, adapted to determine that the called UE is an MRBT service subscriber according to the called UE identifier, determine that the calling UE supports the MRBT early media according to the Early-Session capability identifier and the reliable responses capability identifier of the calling UE, negotiate the MRBT early media with the calling UE, and send a notification signal after successful negotiation to notify play of an MRBT.

A method for implementing the MCID service in an embodiment of the present invention includes:

receiving a call request from a calling UE, where the call request carries a calling UE identifier and a called UE identifier; and determining that the calling UE is an MCID service subscriber according to the calling UE identifier, determining that the called UE supports the MCID early media according to the called UE identifier, negotiating the MCID early media with the called UE, and playing a MCID to the called UE after successful negotiation.

An apparatus for implementing the MCID service in an embodiment of the present invention includes:

a receiving unit, adapted to receive a call request from a calling UE, where the call request carries a calling UE identifier and a called UE identifier; and a first negotiating unit, adapted to: determine that the calling UE is an MCID service subscriber according to the calling UE identifier, determine that the called UE supports the MCID early media according to the called UE identifier, negotiate the MCID early media with the called UE, and play a first notification signal after successful negotiation to notify play of a MCID.

Through the method and system in an embodiment of the present invention, a method for implementing the MRBT service and the MCID service based on the early media is provided so that the user can apply the MRBT service and the MCID service in the IMS, obtain powerful multimedia functions in the IMS and have a better experience.

DETAILED DESCRIPTION OF THE INVENTION

To implement the MRBT service and the MCID service based on the early media, in an embodiment of the present invention, if the network determines that the calling UE is an MCID service subscriber and determines that the called UE supports the MCID early media, the network negotiates the MCID early media with the called UE, and plays an MCID to the called UE if the negotiation succeeds; if the network determines that the called UE is an MRBT service subscriber and the calling UE supports the MRBT early media, the network negotiates the MRBT early media with the calling UE, and plays an MRBT to the calling UE if the negotiation succeeds.

The IMS uses the Session Initiation Protocol (SIP) as a basic signaling protocol, and enables peer-to-peer connections between mobile UEs. In a peer-to-peer call, the media used before the call is set up between the calling UE and the called UE is called "early media", and the media used during the call between the calling UE and the called UE is called "normal media".

The present invention is hereinafter described in detail with reference to embodiments and accompanying drawings.

Figure 1:
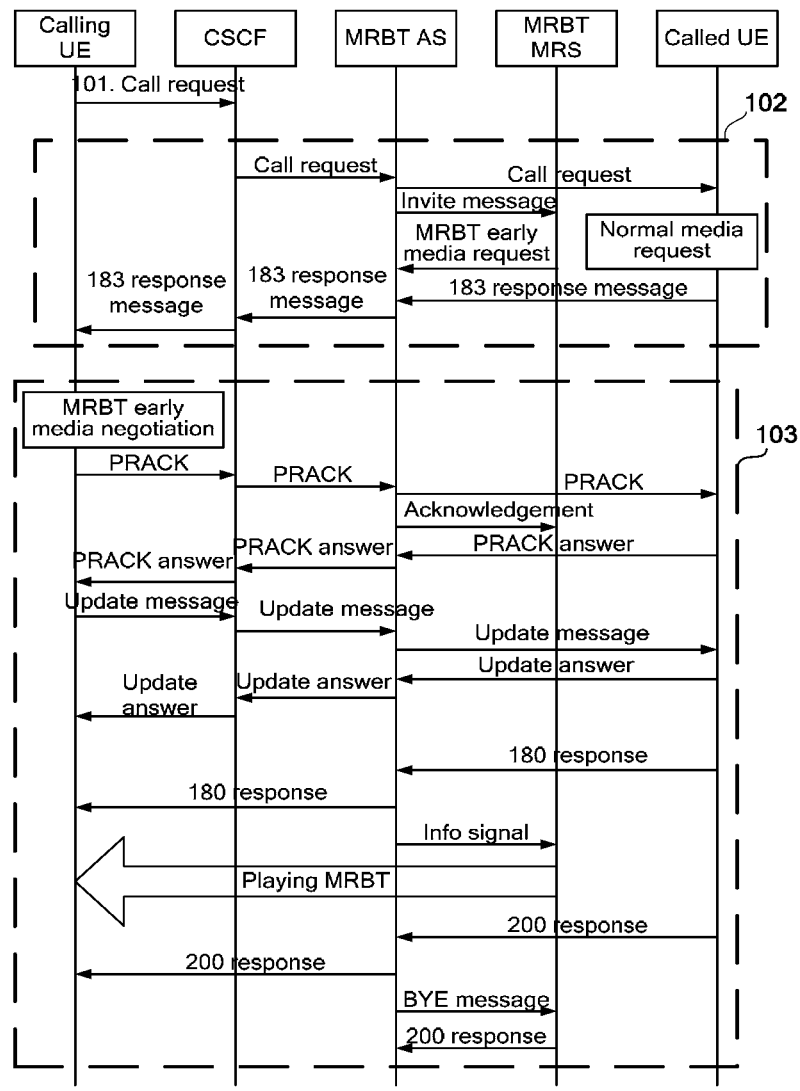
FIG. 1 is a flowchart of implementing the MRBT service in an embodiment of the present invention.

FIG. 1 is a flowchart of implementing the MRBT service in the embodiment 1 of the present invention. The method includes the following steps:

Step 101: The calling UE sends a call request to the network side, where the call request carries a called UE identifier, and an Early-Session capability identifier and a reliable responses capability identifier of the calling UE.

In the embodiment 1 of the present invention, the network may include: an IMS core network, an MRBT Application Server (AS), and an MRBT Multimedia Resource Server (MRS), where the IMS core network includes a Call Session Control Function (CSCF) entity.

In an embodiment of the present invention, the signaling transmission between entities is implemented through routing of the CSCF entity in the IMS core network. For ease of description, the forwarding process through the IMS core network is omitted in the subsequent description about the signaling transmission process. First, the calling UE sends a call request to the CSCF, where the call request carries the called UE identifier. In this embodiment, the called UE identifier may be a called UE connection identifier such as a telephone number. The call request may be sent to the CSCF through an Invite message. The call request carries not only a called UE identifier, but also a normal media request (e.g. Offer). In addition, the "Supported" header field of the message includes an Early-Session capability identifier and a reliable responses capability identifier (eg. 100 rel) of the calling UE to indicate that the calling UE supports the MRBT early media and the reliable response service. Conversely, if the "Supported" header field includes no Early-Session or 100 rel, the calling UE does not support the MRBT early media or the reliable response service.

Step 102: The network determines that the called UE is an MRBT service subscriber according to the called UE identifier, and determines that the calling UE supports the MRBT early media according to the Early-Session capability identifier and the reliable responses capability identifier of the calling UE.

After receiving the call request from the calling UE, the CSCF judges whether the called UE identifier indicates subscription to the corresponding MRBT service according to the stored relationship between the UE identifier and the state of subscribing to the MRBT service. If the called UE identifier indicates subscription to the corresponding MRBT service, the CSCF determines that the called UE is an MRBT service subscriber.

If the CSCF determines that the called UE is an MRBT service subscriber, the CSCF sends the call request to the MRBT AS. After receiving the call request, the MRBT AS determines that the calling UE supports the MRBT early media according to the Early-Session capability identifier and the reliable responses capability identifier of the calling UE carried in the "Supported" header field in the call request, and sends the call request to the corresponding called UE according to the called UE identifier. After receiving the call request, the called UE performs normal media negotiation according to the normal media request in the call request, and returns a response message to the MRBT AS. The response message may be a 183 response message that carries a normal media response message (e.g. Answer).

The MRBT AS may send an Invite message to the MRBT MRS when sending the call request to the called UE. After the MRBT AS sends the Invite message to the MRBT MRS, the MRBT MRS returns a 200 response message carrying an MRBT early media request to the MRBT AS. However, if the calling UE does not support the MRBT early media or the reliable response service, the MRBT AS regards the calling UE as not supporting the MRBT early media, and does not send any Invite message to the MRBT MRS or perform the subsequent MRBT early media negotiation.

After receiving the 183 response message returned by the called UE, the MRBT AS inserts the MRBT early media request into the 183 response message, and sends the 183 response message to the calling UE through the CSCF. In this case, the 183 response message carries not only the normal media response message returned by the called UE, but also the MRBT early media request.

Step 103: The network negotiates the MRBT early media with the calling UE, and plays an MRBT to the calling UE if the negotiation succeeds.

After receiving the 183 response, the calling UE negotiates the MRBT early media. The negotiation method may be that the calling UE judges the encoding type carried in the MRBT early media request in the 183 response message, performs matching according to its own capabilities, and returns the matched negotiation result to the MRBT AS.

When implementing the embodiment of the present invention, the calling UE must support and negotiate the MRBT early media regardless of whether the called UE supports the MRBT early media. After the calling UE receives the MRBT early media request from the MRBT AS, the Answer message from the called UE, and the Early-Session capability identifier and the reliable responses capability identifier of the called UE, the calling UE determines that the called UE has finished the normal media negotiation, and then judges whether the calling UE itself supports the MRBT early media request, for example, judges the matching of the format, the data encoding/decoding type and capabilities. If the requirements are met, namely, the negotiation succeeds, the calling UE sends a provisional response acknowledgement (e.g. PRACK) to the MRBT AS through the CSCF. The PRACK carries the MRBT early media answer (e.g., an MRBT Answer). Conversely, if the 183 message received by the calling UE carries no MRBT early media request, the returned answer signal carries no MRBT Answer. If the call request carries no Early-Session capability identifier or reliable responses capability identifier of the calling UE and the called UE must support resource reservation, the called UE may return a client error (e.g. 4XX) response, and the call is ended. Moreover, if the called UE is a traditional terminal such as a fixed telephone terminal instead of an IMS network terminal, a 180 response message is returned.

After the MRBT AS negotiates the MRBT early media with the calling UE successfully, the MRBT AS sends a PRACK to the called UE, and sends an acknowledgement message to the MRBT MRS, where the acknowledgement message carries the result of negotiating the MRBT early media. After receiving the PRACK, the called UE returns a PRACK answer to the MRBT AS, and the MRBT AS sends the PRACK answer to the calling UE through the CSCF. After a connection is set up between the calling UE and the called UE, the called UE sends a 180 response to the MRBT AS again, indicating readiness of ringing. The MRBT AS sends the 180 response to the calling UE. Then the MRBT AS sends a notification signal to the MRBT MRS, and the MRBT MRS starts playing an MRBT to the calling UE. In this embodiment, the notification signal may be an Info signal.

When the called UE goes off-hook, the called UE sends a 200 response to the MRBT AS, notifying the start of the conversation and stop of playing the MRBT. The MRBT AS sends the 200 response to the calling UE. The MRBT AS sends a BYE message to the MRBT MRS, indicating stop of playing the MRBT early media. The MRBT MRS stops playing the MRBT and returns a 200 response message to the MRBT AS.

Moreover, if the calling UE and called UE require reservation of resources at the time of playing the MRBT early media, an Update message is sent to the MRBT AS through the CSCF before the called UE sends a 180 response to indicate readiness of ringing and after the calling UE finishes resources reservation. The MRBT AS sends the Update message to the called UE, receives the Update response message returned by the called UE, and sends the Update response message to the calling UE through the CSCF. When the called UE goes off-hook, the 200 response sent by the called UE is also intended to require the system to release the reserved early media resources.

Figure 2:
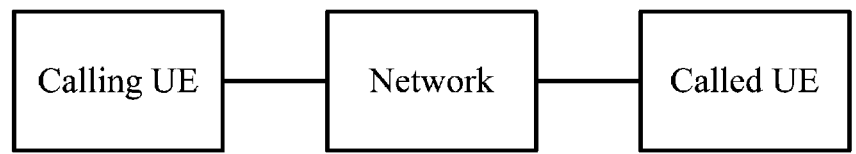
FIG. 2 shows a structure of a system for implementing the MRBT service in an embodiment of the present invention.

Based on the process of implementing the MRBT service in the embodiment 1 of the present invention described above, this embodiment further provides a system for implementing the MRBT service. As shown in FIG. 2, the system includes a calling UE and a network. The calling UE is adapted to send a call request to the network, and negotiate the MRBT early media with the network. The call request carries a called UE identifier, and an Early-Session capability identifier and a reliable responses capability identifier of the calling UE. The network is adapted to: determine that the called UE is an MRBT service subscriber according to the called UE identifier, determine that the calling UE supports the MRBT early media according to the Early-Session capability identifier and the reliable responses capability identifier of the calling UE, negotiate the MRBT early media with the calling UE, and play an MRBT to the calling UE.

The network is further adapted to: judge whether the called UE identifier indicates subscription to the corresponding MRBT service according to the stored relationship between the called UE identifier and the state of subscribing to the MRBT service, and determine that the called UE is an MRBT service subscriber if the called UE identifier indicates subscription to the corresponding MRBT service.

The system further includes a called UE, and the call request further carries a normal media request. The network is further adapted to: send the call request to the called UE, and receive the response message from the called UE, where the response message carries a normal media response message. The called UE is adapted to perform normal media negotiation according to the normal media request, and send the response message to the network.

The network is adapted to: send the MRBT early media request to the calling UE, and receive the MRBT Answer from the calling UE; the calling UE is adapted to: negotiate the MRBT early media according to its own capabilities, and send an MRBT Answer to the network if the negotiation succeeds.

Figure 3:
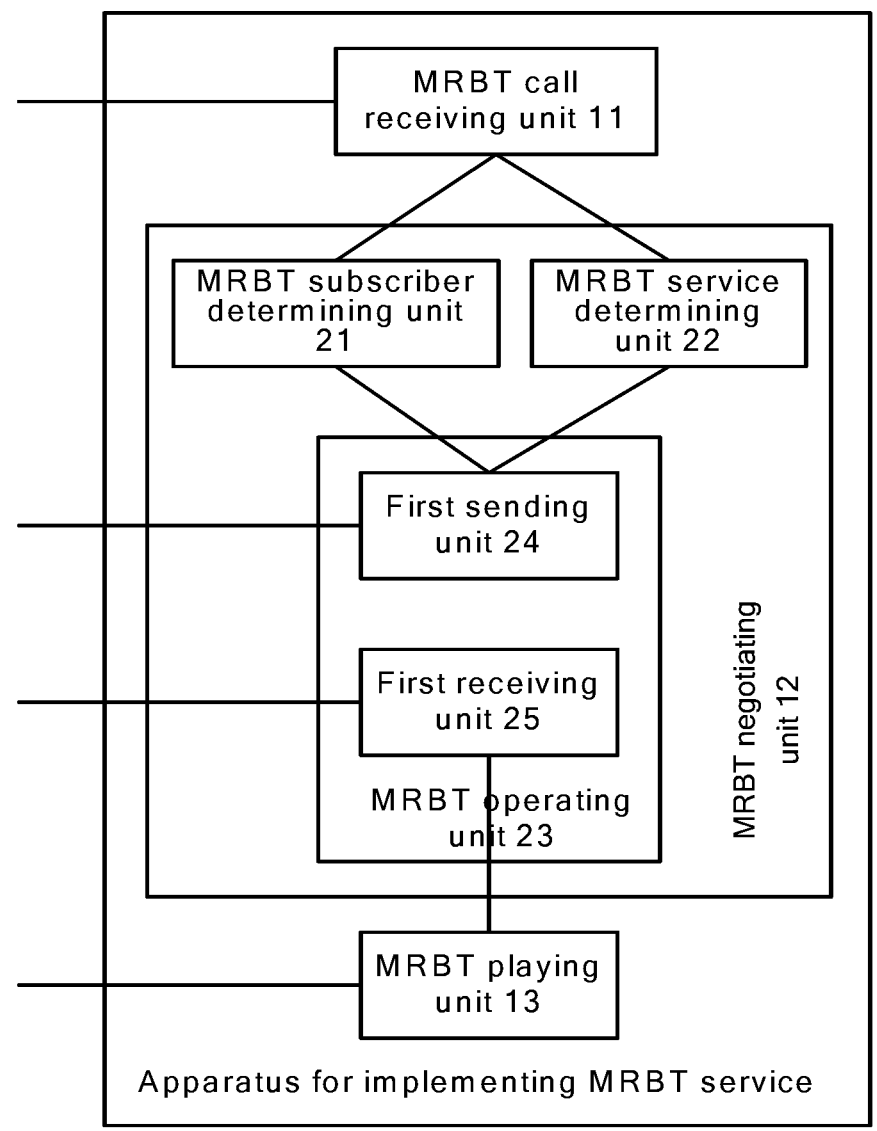
FIG. 3 shows a structure of an apparatus for implementing the MRBT service in an embodiment of the present invention.

Based on the method and system for implementing the MRBT service in an embodiment of the present invention described above, this embodiment also provides an apparatus for implementing the MRBT service. As shown in FIG. 3, the apparatus includes an MRBT call receiving unit 11, an MRBT negotiating unit 12, and an MRBT playing unit 13. The MRBT call receiving unit 11 is adapted to receive the call request from the calling UE, where the call request carries a called UE identifier, and an Early-Session capability identifier and a reliable responses capability identifier of the calling UE; the MRBT negotiating unit 12 is adapted to: determine that the called UE is an MRBT service subscriber according to the called UE identifier, determine that the calling UE supports the MRBT early media according to the Early-Session capability identifier and the reliable responses capability identifier of the calling UE, and then negotiate the MRBT early media with the calling UE; and the MRBT playing unit 13 is adapted to play an MRBT to the calling UE if the negotiation succeeds.

The MRBT negotiating unit 12 includes: an MRBT subscriber determining unit 21, adapted to judge whether the called UE identifier indicates subscription to the corresponding MRBT service according to the stored relationship between the called UE identifier and the state of subscribing to the MRBT service, and determine that the called UE is an MRBT service subscriber if the called UE identifier indicates subscription to the corresponding MRBT service; an MRBT service determining unit 22, adapted to determine that the calling UE supports the MRBT early media according to the Early-Session capability identifier and the reliable responses capability identifier of the calling UE; an MRBT operating unit 23, adapted to negotiate the MRBT early media with the calling UE.

The MRBT operating unit 23 includes: a first sending unit 24, adapted to send the MRBT early media request to the calling UE; and a first receiving unit 25, adapted to receive the MRBT Answer sent by the calling UE.

Figure 4:
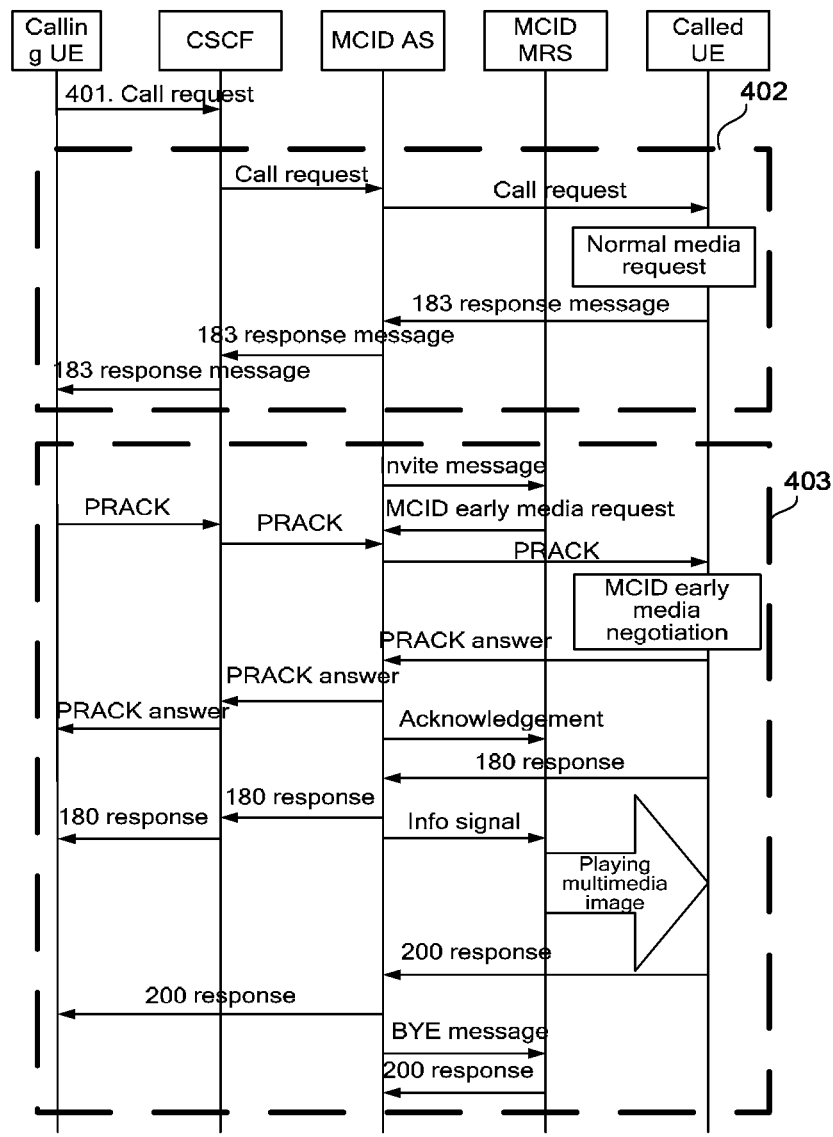
FIG. 4 is a flowchart of implementing the MCID service in an embodiment of the present invention.

FIG. 4 is a flowchart of implementing the MCID service in the embodiment 2 of the present invention. The method includes the following steps:

Step 401: The calling UE sends a call request to the network, where the call request carries a calling UE identifier and a called UE identifier.

As in the embodiment 1, the network in the embodiment 2 may include: an IMS core network, an MRBT AS, and an MRBT MRS, where the IMS core network includes a CSCF entity.

When the call begins, the calling UE sends the call request to the CSCF, where the call request carries a called UE identifier and a calling UE identifier and may be sent through an Invite message. The call request may further carry an Offer, and an Early-Session capability identifier and a reliable responses capability identifier of the calling UE.

Step 402: The network determines that the calling UE is an MCID service subscriber according to the calling UE identifier, and determines that the called UE supports the MCID early media according to the called UE identifier.

After receiving the call request, the CSCF judges whether the calling UE identifier indicates subscription to the corresponding MCID service according to the stored relationship between the UE identifier and the state of subscribing to the MCID service. If the calling UE identifier indicates subscription to the corresponding MCID service, the CSCF determines that the calling UE is an MCID service subscriber.

After determining that the calling UE is an MCID subscriber, the CSCF sends the call request to the MCID AS. After receiving the call request, the MCID AS needs to judge whether the called UE supports the MCID early media. The judging method may be that the MCID AS adds an identifier that requires support of the early media service capability (Early-Session) in the call request, and then sends the call request to the called UE; after receiving the call request, the called UE performs normal media negotiation according to the normal media request in the call request if the early media service capability is supported, and then returns a response message to the MCID AS, where the response message may be a 183 response message and carries an Answer message. The MCID AS sends the 183 response message to the calling UE through the CSCF. If the early media service capability is not supported, a "420 Bad Extension" is returned, and the MCID AS regards the called UE as not supporting the MCID service, and does not perform the subsequent MCID early media negotiation. The Early-Session identifier may be added to the "Require" header field.

Step 403: The network negotiates the MCID early media with the called UE, and plays an MCID to the called UE.

After determining that the calling UE is an MCID service subscriber and the called UE supports the MCID early media, the MCID AS sends an Invite message to the MCID MRS. The MCID MRS returns a 200 response message carrying an MCID early media request to the MCID AS. After receiving the 183 message, the calling UE returns a PRACK to the MCID AS through the CSCF. Afterward, the MCID AS inserts the MCID early media request into the received PRACK, and sends the PRACK to the called UE to negotiate the MCID early media with the called UE. The negotiation process may be that the MCID AS sends a PRACK message to the called UE, where the PRACK message carries an MCID early media request, and an Early-Session capability identifier and a reliable responses capability identifier of the calling UE sent by the calling UE. If the calling UE is not involved in the call request, the MCID AS inserts the two identifiers into the PRACK message. After receiving the PRACK message from the MCID AS, the called UE negotiates the MCID early media according to its own capabilities. If the negotiation succeeds, the called UE sends a PRACK answer to the MCID AS, where the PRACK answer carries an MCID early media answer (e.g., an MCID Answer).

After the MCID AS negotiates the MCID early media with the called UE successfully, the MCID AS sends a PRACK answer to the calling UE through the CSCF, and sends an acknowledgement message to the MCID MRS, where the acknowledgement message carries the result of negotiating the MCID early media (e.g. MCID Answer). After a connection is set up between the calling UE and the called UE, the called UE sends a 180 response to the MCID AS, indicating readiness of ringing. The MCID AS sends a 180 response to the calling UE through the CSCF. Afterward, the MCID AS sends a notification signal to the MCID MRS. The MCID MRS starts playing a MCID to the called UE. In this embodiment, the notification signal may be an Info signal.

After the called party goes off-hook, the called UE returns a 200 response as a notification signal to the MCID AS, and then the MCID AS returns the 200 response to the calling UE. In addition, the MCID AS sends a BYE message to the MCID MRS, indicating stop of playing the MCID early media. The MCID MRS stops playing the MCID and returns a 200 response message to the MCID AS.

If the calling UE and the called UE require resources reservation at the time of negotiating the MCID early media, the calling UE sends an Update message to the called UE before the called UE sends a 180 response to indicate readiness of ringing and after the calling UE finishes reserving the resources. After sending an Update response to the calling UE, the called UE sends a 180 response to indicate readiness of ringing. When the called UE goes off-hook, the 200 response sent by the called UE is also intended to require the system to release the reserved early media resources.

Figure 5:
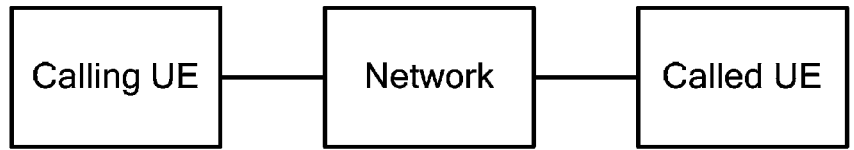
FIG. 5 shows a structure of a system for implementing the MCID service in an embodiment of the present invention.

Based on the method for implementing the MCID service in the embodiment 2 of the present invention described above, this embodiment further provides a system for implementing the MCID service. As shown in FIG. 5, the system includes a calling UE, a called UE and a network. The calling UE is adapted to send a call request to the network, where the call request carries a calling UE identifier and a called UE identifier. The network is adapted to determine that the calling UE is an MCID service subscriber according to the received calling UE identifier, determine that the called UE supports the MCID early media according to the called UE identifier, negotiate the MCID early media with the called UE, and play a multimedia media to the called UE if the negotiation succeeds; and the called UE is adapted to negotiate the MCID early media with the network.

The network is further adapted to judge whether the calling UE identifier indicates subscription to the corresponding MCID service according to the stored relationship between the UE identifier and the state of subscribing to the MCID service. If the calling UE identifier indicates subscription to the corresponding MCID service, the network determines that the calling UE is an MCID service subscriber. If the call request includes a normal media request, the called UE is further adapted to perform normal media negotiation and send the answer message to the network according to the normal media request; the network is adapted to add an identifier that requires support of the early media service capability to the call request that carries a normal media request, send the call request to the called UE, and receive the answer message sent by the called UE. If the answer message is a normal provisional answer, it is determined that the called UE supports the MCID early media. The capability identifier that requires support of the early media service may be added to the "Require" header field.

The network is adapted to: send the MCID early media request to the called UE, and receive the MCID early media answer (e.g. MCID Answer) from the called UE; the called UE is adapted to negotiate the MCID early media according to its own capabilities, and send an MCID Answer to the network if the negotiation succeeds.

Figure 6:
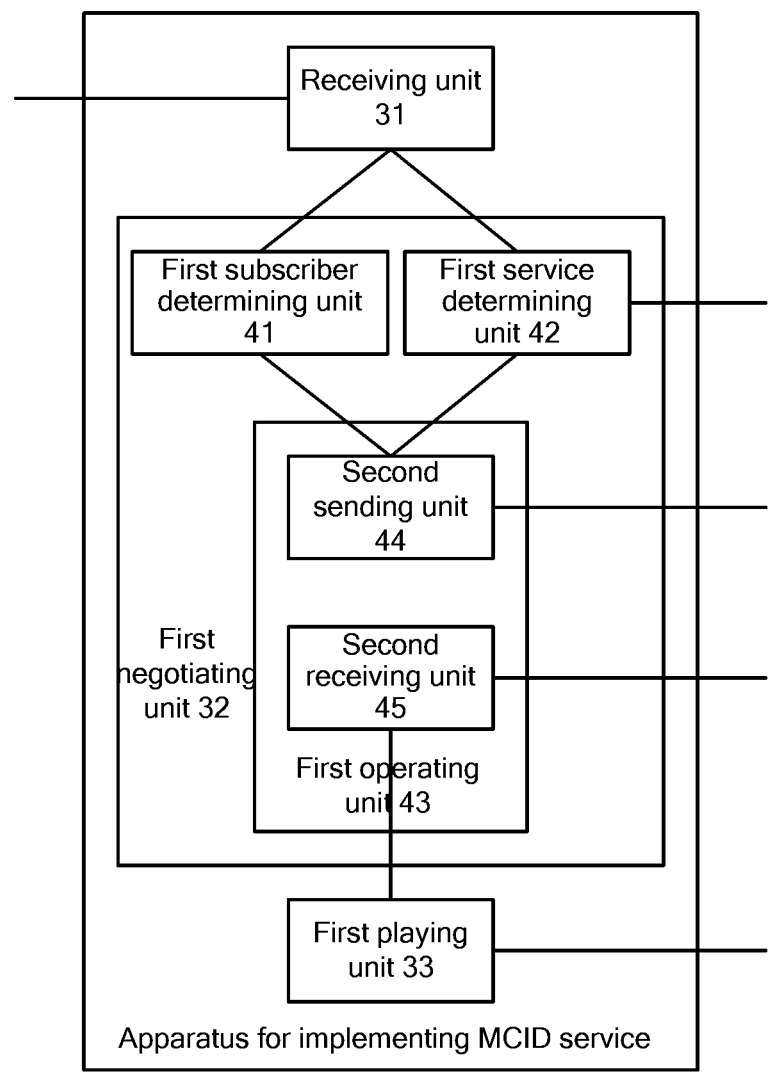
FIG. 6 shows a structure of an apparatus for implementing the MCID service in an embodiment of the present invention.

Based on the method and system for implementing the MCID service in an embodiment of the present invention described above, this embodiment further provides an apparatus for implementing the MCID service. As shown in FIG. 6, the apparatus includes a receiving unit 31, a first negotiating unit 32, and a first playing unit 33. The receiving unit 31 is adapted to receive the call request from the calling UE, where the call request carries a calling UE identifier and a called UE identifier; the first negotiating unit 32 is adapted to determine that the calling UE is an MCID service subscriber according to calling UE identifier, determine that the called UE supports the MCID early media according to the called UE identifier, and then negotiate the MCID early media with the called UE; and the first playing unit 33 is adapted to play a MCID to the called UE if the negotiation succeeds.

The call request carries a normal media request. The first negotiating unit 32 may further include: a first subscriber determining unit 41, adapted to judge whether the calling UE identifier indicates subscription to the corresponding MCID service according to the stored relationship between the UE identifier and the state of subscribing to the MCID service, and, if the calling UE identifier indicates subscription to the corresponding MCID service, determine that the calling UE is an MCID service subscriber; a first service determining unit 42, adapted to add an identifier that requires support of the early media service capability to the call request that carries a normal media request, send the call request to the called UE, receive the answer message from the called UE, and determine that the called UE supports the MCID early media if the called UE returns a normal provisional answer, where the capability identifier that requires support of the early media service may be added to the "Require" header field; and a first operating unit 43, adapted to negotiate the MCID early media with the called UE.

The first operating unit 43 includes: a second sending unit 44, adapted to send the MCID early media request to the called UE; and a second receiving unit 45, adapted to receive the MCID Answer sent by the called UE.

Figure 7:
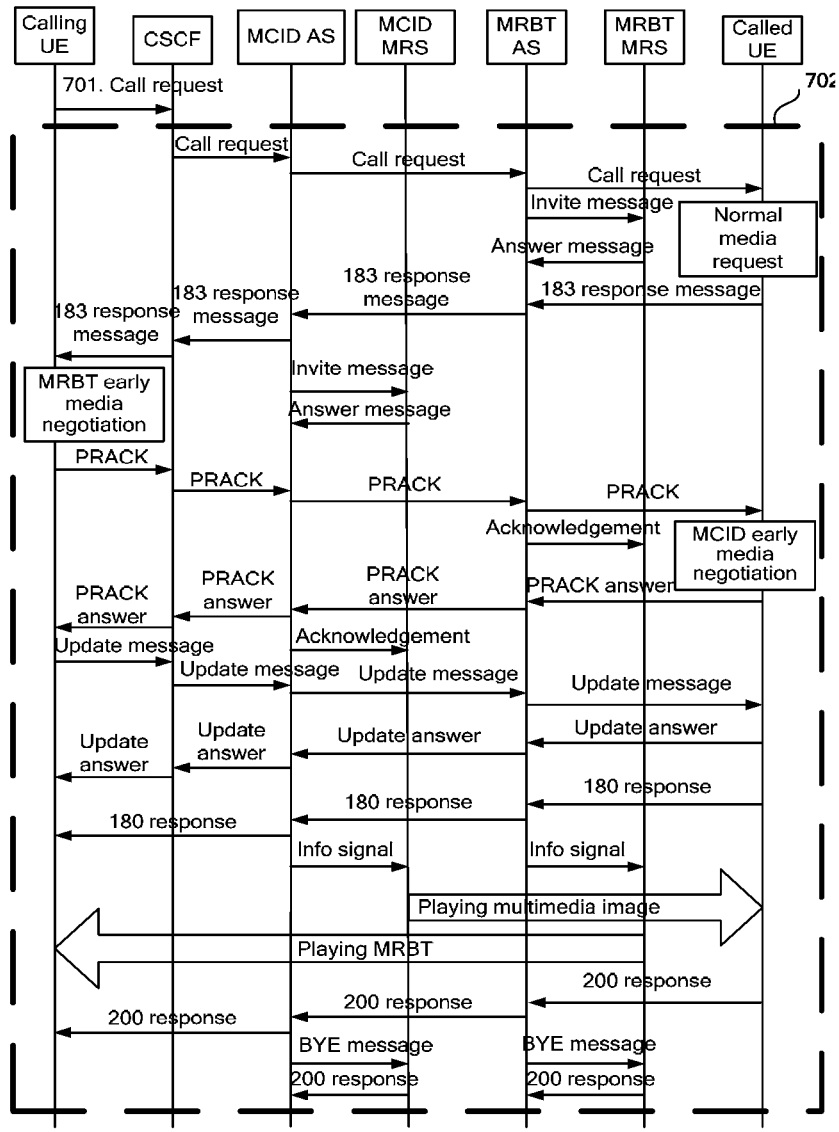
FIG. 7 is a flowchart of implementing the MRBT service and the MCID service in an embodiment of the present invention.

Based on the embodiment 2 described above, the MRBT service may be implemented at the time of implementing the MCID service. Therefore, the third embodiment provides a method for implementing the MRBT service on the basis of implementing the MCID service. FIG. 7 is a flowchart of the third embodiment. The method includes the following steps:

Step 701: The calling UE sends a call request to the network, where the call request carries a calling UE identifier, a called UE identifier, and an Early-Session capability identifier and a reliable responses capability identifier of the calling UE.

Likewise, this embodiment supposes that the network includes an IMS core network, an MCID AS, an MCID MRS, an MRBT AS and an MRBT MRS, and the IMS core network includes a CSCF entity.

At the beginning of the call, the calling UE sends a call request to the CSCF, where the call request carries a calling UE identifier, a called UE identifier, and an Early-Session capability identifier and a 100 rel capability identifier of the calling UE. Likewise, the call request may be sent through an Invite message. The call request may include a normal media request in addition to the foregoing information.

Step 702: After the network determines that calling UE is an MCID service subscriber according to the calling UE identifier and determines that the called UE supports the MCID early media according to the called UE identifier, the network negotiates the MCID early media with the called UE, and plays a MCID to the called UE; after the network determines that called UE is an MRBT service subscriber according to the called UE identifier and determines that the calling UE supports the MRBT early media according to the Early-Session capability identifier and the reliable responses capability identifier of the calling UE, the network negotiates the MRBT early media with the calling UE, and plays an MRBT to the calling UE.

After receiving the call request from the calling UE, the CSCF judges whether the calling UE identifier indicates subscription to the corresponding MCID service according to the stored relationship between the UE identifier and the state of subscribing to the MCID service. If the calling UE identifier indicates subscription to the corresponding MCID service, the CSCF determines that the calling UE is an MCID service subscriber.

After determining that the calling UE is an MCID subscriber, the CSCF sends the call request to the MCID AS. After receiving the call request, the MCID AS needs to judge whether the called UE supports the MCID early media. The judging method may be: adding an identifier that requires support of the early media service capability to the "Require" header field of the call request that carries a normal media request, sending the call request to the called UE, and receiving the answer message from the called UE, and, if the answer message returned by the called UE is a normal provisional answer, determining that the called UE supports the MCID early media and the MCID early media negotiation may be performed subsequently.

In the foregoing process, the MCID AS sends the call request to the called UE through the CSCF. Likewise, when the CSCF forwards the call request, the CSCF may judge whether the called UE identifier indicates subscription to the corresponding MRBT service according to the stored relationship between the UE identifier and the state of subscribing to the MRBT service. If the called UE identifier indicates subscription to the corresponding MRBT service, the CSCF determines that the called UE is an MRBT service subscriber, and the call request is sent by the MCID AS through the MRBT AS to the called UE. Specifically, after receiving the call request, the MRBT AS determines that the calling UE supports the MRBT early media according to the Early-Session capability identifier and the reliable responses capability identifier of the calling UE carried in the "Supported" header field of the call request, and sends the call request to the corresponding called UE according to the called UE identifier. After the called UE receives the call request, if the called UE supports the early media service capability, the called UE performs normal media negotiation according to the normal media request in the call request, and returns a response message to the MRBT AS. The response message may be a 183 response message that carries a normal media response message (e.g., an Answer).

In the foregoing process, the information received by the MRBT AS from the CSCF may include both the MRBT media information and the MCID media information. The MRBT AS resolves the MRBT media and MCID media according to the "address" message in the "o" line of the Service Data Point (SDP). If the address is the same as the address in the "o" line of the received SDP which is sent through an Invite message, the information is MRBT media; otherwise, the information is MCID media.

In the process of negotiating the MRBT early media and the process of negotiating the MCID early media:

On the one hand, in the embodiment of the present invention, the MRBT AS sends an Invite message to the MRBT MRS while sending the call request to the called UE. After the MRBT AS sends the Invite message to the MRBT MRS, the MRBT MRS returns a 200 response message to the MRBT AS, where the 200 response message carries an MRBT early media request. The MRBT AS negotiates the MRBT early media with the calling UE. The negotiation method may be that the MRBT AS receives the 183 message returned by the called UE, inserts the MRBT early media request into the 183 message, and sends the 183 message to the calling UE. The 183 message carries an MRBT early media request, an Answer message returned by the called UE, and an Early-Session capability identifier and a reliable responses capability identifier of the called UE. After receiving the MRBT early media request sent by the MRBT AS, the Answer message returned by the called UE, and the Early-Session capability identifier and the reliable responses capability identifier of the called UE, the calling UE determines that the called UE has finished the normal media negotiation, and supports the MRBT early media. Afterward, the calling UE performs MRBT early media negotiation according to its own capabilities, and sends a PRACK message to the CSCF, if the negotiation succeeds, The CSCF sends the PRACK to the MRBT AS through the MCID AS. The PRACK message carries an MRBT Answer. After the MRBT AS negotiates the MRBT early media with the calling UE successfully, the MRBT AS sends the PRACK message to the called UE, and sends an acknowledgement message to the MRBT MRS, where the acknowledgement message carries the result of negotiating the MRBT early media (e.g., MRBT Answer).

On the other hand, while the calling UE performs the MRBT early media negotiation, the MCID AS sends an Invite message to the MCID MRS. The MCID MRS returns a 200 response message carrying an MCID early media request to the MCID AS. Afterward, after receiving the PRACK message sent by the calling UE through the CSCF, the MCID AS inserts the MCID early media request into the PRACK, sends the PRACK to the called UE through the MRBT AS, and negotiates the MCID early media with the called UE. After the negotiation succeeds, the called UE returns a PRACK answer message to the MCID AS. The MCID AS sends a PRACK answer to the calling UE, and sends an acknowledgement message to the MCID MRS, where the acknowledge message carries the result of negotiating the MCID early media (e.g. MCID Answer).

After a connection is set up between the calling UE and the called UE, the called UE sends a 180 response to the MRBT AS. The MRBT AS sends the 180 response to the MCID AS, indicating readiness of ringing. The MCID AS sends the 180 response to the calling UE, and sends a notification signal to the MCID MRS. The MCID MRS starts playing a MCID to the called UE. In this embodiment, the notification signal may be an Info signal. After the called party goes off-hook, the called UE returns a 200 response as a notification signal to the MCID AS, and then the MCID AS returns the 200 response to the calling UE. Afterward, the MCID AS sends a BYE message to the MCID MRS, indicating stop of playing the MCID early media. The MCID MRS stops playing the MCID and returns a 200 response message to the MCID AS.

Meanwhile, the MRBT AS sends a notification signal to the MRBT MRS. The MRBT MRS starts playing an MRBT to the calling UE. In this embodiment, the notification signal may be an Info signal. When the called UE goes off-hook, the called UE sends a 200 response to the MRBT AS, notifying the start of the conversation and stop of playing the MRBT. The MRBT AS sends the 200 response to the calling UE. Therefore, the MRBT AS sends a BYE message to the MRBT MRS, indicating stop of playing the MRBT early media. The MRBT MRS stops playing the MRBT and returns a 200 response message to the MRBT AS.

Moreover, if the calling UE and the called UE require reservation of resources at the time of negotiating the MRBT and MCID early media, the calling UE sends an Update message to the called UE before the called UE sends a 180 response to indicate readiness of ringing and after the calling UE finishes reserving the resources. After sending an Update response to the calling UE, the called UE sends a 200 response to indicate readiness of ringing. When the called UE goes off-hook, namely, when the MRBT service and the MCID service are completed, the CSCF receives the 200 response message sent by the called UE to the MRBT AS and MCID AS, and therefore, releases the reserved MRBT and MCID media resources.

The sequence for implementing the foregoing embodiments is not unique. When implementing the embodiment of the present invention, the calling UE must support and negotiate the MRBT early media regardless of whether the called UE supports the MRBT early media; the called UE must support and negotiate the MCID early media regardless of whether the calling UE supports the MCID early media. Meanwhile, if the calling UE has not subscribed to the MCID service, neither the normal call service nor the MRBT service is affected; if the called UE has not subscribed to the MRBT service, neither the normal call service nor the MCID service is affected. Besides, the foregoing method may also be regarded as implementing the MCID service on the basis of implementing the MRBT service.

Figure 8:
FIG. 8 shows a structure of a system for implementing the MRBT service and the MCID service in an embodiment of the present invention.

Based on the method for implementing the MRBT service and MCID service in the third embodiment of the present invention described above, this embodiment further provides a system for implementing the MRBT service while implementing the MCID service. As shown in FIG. 8, the system includes a calling UE, a called UE and a network. The calling UE is adapted to send a call request to the network, where the call request carries a calling UE identifier and a called UE identifier. The network is adapted to: determine that the calling UE is an MCID service subscriber according to the received calling UE identifier, determine that the called UE supports the MCID early media according to the called UE identifier, negotiate the MCID early media with the called UE, and play a MCID to the called UE if the negotiation succeeds; and the called UE is adapted to negotiate the MCID early media with the network.

If the call request carries an Early-Session capability identifier and a reliable responses capability identifier of the calling UE, the calling UE is further adapted to negotiate the MRBT early media with the network; the network is further adapted to: determine that the called UE is an MRBT service subscriber according to the called UE identifier, determine that the calling UE supports the MRBT early media according to the Early-Session capability identifier and the reliable responses capability identifier of the calling UE, and then negotiate the MRBT early media with the calling UE, and play an MRBT to the calling UE if the negotiation succeeds.

The network is further adapted to judge whether the calling UE identifier indicates subscription to the corresponding MCID service according to the stored relationship between the UE identifier and the state of subscribing to the MCID service. If the calling UE identifier indicates subscription to the corresponding MCID service, the network determines that the calling UE is an MCID service subscriber. Moreover, the network is further adapted to: judge whether the called UE has subscribed to the MRBT service according to the stored relationship between the UE identifier and the state of subscribing to the MRBT service, and determine that the called UE is an MRBT service subscriber if the called UE has subscribed to the corresponding MRBT service.

If the call request includes a normal media request, the called UE is further adapted to perform normal media negotiation and send the answer message to the network according to the normal media request; the network is adapted to: add an identifier that requires support of the early media service capability to the "Require" header field of the call request that carries a normal media request, send the call request to the called UE, and receive the answer message sent by the called UE. If the answer message is a normal provisional answer, it is determined that the called UE supports the MCID early media.

The network is adapted to: send the MCID early media request to the called UE, and receive the MCID early media answer (MCID Answer) from the called UE; the called UE is adapted to: negotiate the MCID early media according to its own capabilities, and send an MCID Answer to the network if the negotiation succeeds.

The network is adapted to: send the MRBT early media request to the calling UE, and receive the MRBT Answer from the calling UE; the calling UE is adapted to: negotiate the MRBT early media according to its own capabilities, and send an MRBT Answer to the network if the negotiation succeeds.

Figure 9:
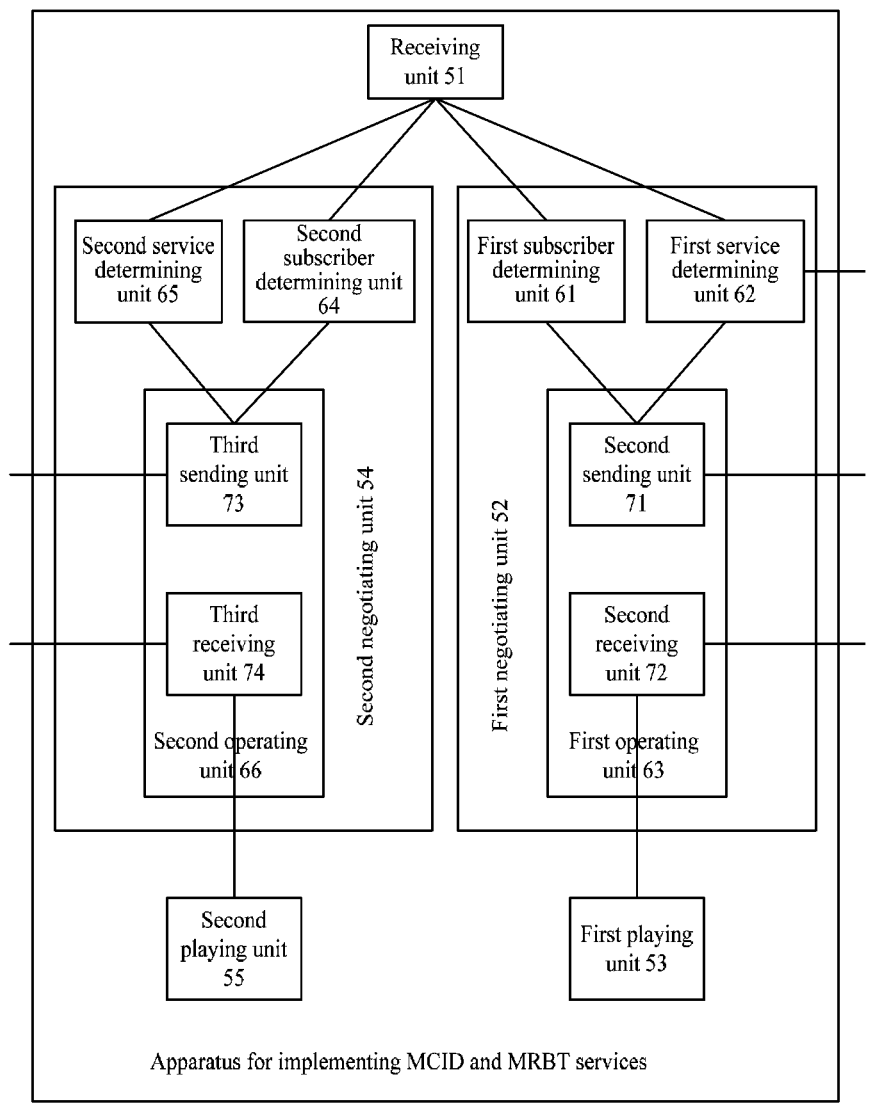
FIG. 9 shows a structure of an apparatus for implementing the MRBT service and the MCID service in an embodiment of the present invention.

Based on the method and system in the third embodiment described above, this embodiment further provides an apparatus for implementing the MRBT service on the basis of implementing the MCID service. As shown in FIG. 9, the apparatus may be implemented on the basis of FIG. 6, and includes a receiving unit 51, a first negotiating unit 52, and a first playing unit 53. The receiving unit 51 is adapted to receive the call request from the calling UE, where the call request carries a calling UE identifier and a called UE identifier; the first negotiating unit 52 is adapted to determine that the calling UE is an MCID service subscriber according to the calling UE identifier, determine that the called UE supports the MCID early media according to the called UE identifier, and then negotiate the MCID early media with the called UE; and the first playing unit 53 is adapted to play a MCID to the called UE if the negotiation succeeds.

If the call request further carries an Early-Session capability identifier and a 100 rel capability identifier of the calling UE, the apparatus further includes: a second negotiating unit 54, adapted to determine that the called UE is an MRBT service subscriber according to the called UE identifier, determine that the calling UE supports the MRBT early media according to the Early-Session capability identifier and the reliable responses capability identifier of the calling UE, and then negotiate the MRBT early media with the calling UE; and a second playing unit 55, adapted to play an MRBT to the calling UE if the negotiation succeeds.

The call request carries a normal media request. The first negotiating unit 52 includes: a first subscriber determining unit 61, adapted to: judge whether the calling UE has subscribed to the MCID service according to the stored relationship between the UE identifier and the state of subscribing to the MCID service, and, if the calling UE has subscribed to the MCID service, determine that the calling UE is an MCID service subscriber; a first service determining unit 62, adapted to add an identifier that requires support of the early media service capability to the "Require" header field of the call request that carries a normal media request, send the call request to the called UE, receive the answer message from the called UE, and determine that the called UE supports the MCID early media if the called UE returns a normal provisional answer; and a first operating unit 63, adapted to negotiate the MCID early media with the called UE.

The first operating unit 63 includes: a second sending unit 71, adapted to send the MCID early media request to the called UE; and a second receiving unit 72, adapted to receive the MCID Answer sent by the called UE.

The second negotiating unit 54 includes: a second subscriber determining unit 64, adapted to: judge whether the called UE has subscribed to the MRBT service according to the stored relationship between the UE identifier and the state of subscribing to the MRBT service, and determine that the called UE is an MRBT service subscriber if the called UE has subscribed to the MRBT service; a second service determining unit 65, adapted to determine that the calling UE supports the MRBT early media according to the Early-Session capability identifier and the reliable responses capability identifier of the calling UE; and a second operating unit 66, adapted to negotiate the MRBT early media with the calling UE.

The second operating unit 66 includes: a third sending unit 73, adapted to send the MRBT early media request to the calling UE; and a third receiving unit 74, adapted to receive the MRBT Answer sent by the calling UE.

It is understandable to those skilled in the art that all or part of the steps in the foregoing embodiments may be implemented through hardware instructed by programs. The programs may be stored in a storage medium (such as ROM/RAM, magnetic disk, and compact disk) readable by a computer (namely, personal computer, server, network device, and so on).

Through the embodiments of the present invention, a method for implementing the MRBT service and MCID service based on the early media is provided so that the user can apply the MRBT service and the MCID service in the IMS, obtain powerful multimedia functions in the IMS and have a better experience.

Although the invention has been described through some exemplary embodiments, the invention is not limited to such embodiments. It is apparent that those skilled in the art can make various modifications and variations to the present invention without departing from the spirit and scope of the present invention. The present invention is intended to cover these modifications and variations provided that they fall in the scope of protection defined by the following claims or their equivalents.

What is claimed is:

1. A method for implementing Multimedia Caller Identification (MCID) services, comprising:
   receiving, by a network, a call request from a calling User Equipment (UE), where the call request carries a calling UE identifier and a called UE identifier; and
   determining, by the network, that the calling UE is an MCID service subscriber according to the calling UE identifier,
   sending, by the network, the call request to the called UE according to the called UE identifier, determining that a called UE supports MCID early media according to a first response message from the called UE;
   forwarding, by the network, the first response message from the called UE to the calling UE, receiving a provisional response acknowledgement (PRACK) returned by the calling UE, inserting an MCID early media request into the received PRACK message, sending the PRACK message carrying the MCID early media request to the called UE, negotiating the MCID early media with the called UE, receiving an MCID early media answer from the called UE when the negotiation succeeds, and playing an MCID to the called UE.

2. The method of claim 1, wherein the call request carries a normal media request, and the process of determining that the called UE supports the MCID early media according to the called UE identifier comprises:
- adding an identifier that requires support of early media service capability to the call request;
- by the called UE, negotiating normal media according to the normal media request if the called UE supports the early media service capability, and returning a negotiation result to a network through a normal provisional answer message; and
- determining that the called UE supports the MCID early media after receiving the normal provisional answer message.

3. The method of claim 1, wherein the negotiating the MCID early media with the called UE comprises:
- negotiating the MCID early media with the called UE according to capabilities of the called UE.

4. The method of claim 3, wherein before negotiating the MCID early media with the called UE, the method comprises:
- sending, by an MCID Application Server (MCID AS), an Invite message to an MCID Multimedia Resource Server (MCID MRS), through an IP Multimedia Subsystem (IMS) core network; and
- sending, by the MCID MRS, the MCID early media request to the MCID AS through the IMS core network.

5. The method of claim 4, wherein after successful negotiation and before playing the MCID to the called UE, the method comprises:
- sending, by the MCID AS, a notification signal to the MCID MRS to instruct the MCID MRS to play the MCID to the called UE.

6. The method of claim 5 wherein the call request further comprises an early session (Early-Session) supporting capability identifier and reliable responses capability identifier of the calling UE, and the method further comprises:
- determining that the called UE is a Multimedia Ring Back Tone (MRBT) service subscriber according to the called UE identifier, determining that the calling UE supports MRBT early media according to the Early-Session capability identifier and the reliable responses capability identifier of the calling UE, sending an MRBT early media request to the calling UE, negotiating the MRBT early media with the calling UE, receiving an MRBT early media answer from the calling UE when the negotiation succeeds, and playing an MRBT to the calling UE.

7. The method of claim 6, wherein the process of determining that the called UE is the MRBT service subscriber comprises:
- judging whether the called UE has subscribed to a corresponding MRBT service according to the corresponding subscribing relationship between the UE identifier and the MRBT service; and determining that the called UE is the MRBT service subscriber if the called UE has subscribed to the corresponding MRBT service.

8. The method of claim 6, wherein the process of sending an MRBT early media request to the calling UE, negotiating the MRBT early media with the calling UE comprises:
- sending the call request to the called UE, receiving a second response message returned by the called UE, inserting an MRBT early media request into the second response message, sending the second response message carrying the MRBT early media request to the calling UE; and
- by the calling UE, negotiating the MRBT early media according to capabilities of the calling UE, and returning an MRBT early media answer (MRBT Answer), if the negotiation succeeds.

9. An apparatus for implementing Multimedia Caller Identification (MCID) services, comprising:
- a first receiving unit, configured to receive a call request from a calling User Equipment (UE), where the call request carries a calling UE identifier and a called UE identifier; and
- a first negotiating unit, configured to determine that the calling UE is an MCID service subscriber according to the calling UE identifier, send the call request to the called UE according to the called UE identifier, determine that a called UE supports MCID early media according to a first response message from the called UE, forward the first response message from the called UE to the calling UE, receive a provisional response acknowledgement (PRACK) returned by the calling UE, insert an MCID early media request into the received PRACK message, send the PRACK message carrying the MCID early media request to the called UE, negotiate the MCID early media with the called UE, receive an MCID early media answer, and play a first notification signal after successful negotiation to notify playing of an MCID.

10. The apparatus of claim 9, further comprising:
- a second negotiating unit, configured to determine that the called UE is a Multimedia Ring Back Tone (MRBT) service subscriber according to the called UE identifier, determine that the calling UE supports MRBT early media according to an early session (Early-Session) supporting capability identifier and reliable responses capability identifier of the calling UE, negotiate the MRBT early media with the calling UE, and send a second notification signal after successful negotiation to notify playing of an MRBT; and
- a playing unit, configured to receive the second notification signal, and play the MRBT to the calling UE.

11. The apparatus of claim 9, wherein the first negotiating unit comprises:
- a first subscriber determining unit, configured to judge whether the calling UE has subscribed to an MCID service according to the corresponding subscribing relationship between the UE identifier and the MCID service, and, if the calling UE has subscribed to the MCID service, determine that the calling UE is an MCID service subscriber;
- a service determining unit, configured to add an identifier that requires support of early media service capability to the call request that carries a normal media request, send the call request to the called UE, receive an answer message from the called UE, and determine that the called UE supports the MCID early media if the called UE returns a normal provisional answer; and
- a first operating unit, configured to negotiate the MCID early media with the called UE.

12. The apparatus of claim 10, wherein the second negotiating unit comprises:
- a second subscriber determining unit, configured to judge whether the called UE has subscribed to an MRBT service according to corresponding subscribing relationship between the UE identifier and the MRBT service, and, if the called UE has subscribed to the MRBT service, determine that the called UE is the MRBT service subscriber;

an MRBT service determining unit, configured to determine that the calling UE supports the MRBT early media according to the Early-Session capability identifier and the reliable responses capability identifier of the calling UE; and a second operating unit, configured to send an MRBT early media request to the calling UE, negotiate the MRBT early media with the calling UE, receive an MRBT early media answer from the calling UE when the negotiation succeeds.

13. The apparatus of claim 12, wherein the second operating unit is configured to send the call request to the called UE, receive a second response message returned by the called UE, insert an MRBT early media request into the second response message, send the response message carrying the MRBT early media request to the calling UE, receive an MRBT early media answer from the calling UE if the negotiation succeeds.

* * * * *